(12) United States Patent
Woods et al.

(10) Patent No.: US 7,067,601 B2
(45) Date of Patent: Jun. 27, 2006

(54) MULTI-FUNCTIONAL ALPHA-ALKOXYALKYL ACRYLATE AND METHACRYLATE ESTER COMPOSITIONS AND REWORKABLE POLYMERS FORMED THEREFROM

(75) Inventors: John G. Woods, Farmington, CT (US); Susanne D. Morrill, West Hartford, CT (US)

(73) Assignee: Henkel Corporation, Rocky Hill, CT (US)

( * ) Notice: Subject to any disclaimer, the term of this patent is extended or adjusted under 35 U.S.C. 154(b) by 96 days.

(21) Appl. No.: 10/415,904

(22) PCT Filed: Nov. 15, 2001

(86) PCT No.: PCT/US01/45273

§ 371 (c)(1),
(2), (4) Date: May 5, 2003

(87) PCT Pub. No.: WO02/46291

PCT Pub. Date: Jun. 13, 2002

(65) Prior Publication Data

US 2005/0101689 A1    May 12, 2005

(51) Int. Cl.
*C08F 116/34*    (2006.01)

(52) U.S. Cl. .................. 526/315; 526/316; 526/320

(58) Field of Classification Search ............... 526/315, 526/316, 320
See application file for complete search history.

(56) References Cited

U.S. PATENT DOCUMENTS

| | | | | |
|---|---|---|---|---|
| 4,387,186 A | * | 6/1983 | Williams et al. | 525/327.8 |
| 4,758,447 A | * | 7/1988 | Broer et al. | 427/513 |
| 4,842,936 A | * | 6/1989 | Kashihara et al. | 428/407 |
| 5,486,562 A | | 1/1996 | Borman et al. | 524/451 |
| 5,512,612 A | | 4/1996 | Brown et al. | 523/218 |
| 5,800,973 A | | 9/1998 | Anderson et al. | 430/537 |
| 5,872,158 A | | 2/1999 | Kuczynski | 522/182 |
| 5,969,000 A | * | 10/1999 | Yang et al. | 523/116 |
| 6,225,389 B1 | * | 5/2001 | Saint Victor | 524/224 |
| 6,443,378 B1 | * | 9/2002 | Huang et al. | 241/169.1 |
| 2001/0053820 A1 | * | 12/2001 | Yeager et al. | 525/186 |
| 2003/0027900 A1 | * | 2/2003 | Burgel et al. | 524/2 |
| 2003/0171663 A1 | * | 9/2003 | Munro et al. | 600/391 |

* cited by examiner

*Primary Examiner*—Bernard Lipman
*Assistant Examiner*—Tatyana Zalukaeva
(74) *Attorney, Agent, or Firm*—Steven C. Bauman

(57) ABSTRACT

Adhesive compositions are disclosed which include acrylates, their polymers, and free radical initiators. The compositions include a multi-functional alpha-alkoxyalkyl (meth)acrylate compound and a free radical initiator. The multi-functional alpha-alkoxyalkyl (meth)acrylate compound is the reaction product of: (a) a (meth)acrylic acid or a (meth)acrylate ester having a free carboxylic acid group; and (b) a compound including two or more 1-alkenyl ether groups and free of acetal and ketal groups, or a compound free of acetal and ketal groups and including one or more 1-alkenyl ether groups and a (meth)acrylate group. The compositions are easier and less expensive to prepare than conventional acrylate compositions and degrade when contacted with an acid medium or when heated. The compositions are useful in a wide range of applications and are compatible with conventional adhesive additives.

10 Claims, No Drawings

MULTI-FUNCTIONAL
ALPHA-ALKOXYALKYL ACRYLATE AND
METHACRYLATE ESTER COMPOSITIONS
AND REWORKABLE POLYMERS FORMED
THEREFROM

FIELD OF THE INVENTION

The present invention relates to curable (meth)acrylate compositions and reworkable polymers formed therefrom. When cured, these compositions can be degraded when contacted with an acid medium or when heated. More particularly, the compositions of the present invention include multi-functional alpha-alkoxyalkyl(meth)acrylate monomers.

BRIEF DESCRIPTION OF RELATED
TECHNOLOGY (Meth)acrylates have been widely used to form polymers which are capable of curing by a variety of mechanisms. For example, it is known to use multifunctional (meth)acrylates to form photopolymerizable polymers for many applications including coatings and adhesives. However, such polymers are often poorly intractable and not suitable for applications where degradation of the polymer is desirable, such as in the temporary fixation of lenses and prisms in optical components and in the mounting of electronic components in the assembly of printed circuit boards.

To overcome these disadvantages, reworkable acrylate compounds have been developed which permit the formed polymer to be degraded, such as by heat or acid. For example, U.S. Pat. No. 5,872,158 to Kuczynski discloses acetal diacrylate compounds, such as beta-alkoxyalkyl diacrylates, which are used to form reworkable polymers. These polymers include a conventional acetal group (a non-ester acetal) as a labile group which may be cleaved by acid, and have one labile group for every two functional groups present. They are not readily decomposed by heating.

Additionally, it is known to use difunctional methacrylate monomers as cross-linking agents in the anionic polymerization of poly(methyl methacrylate) in the preparation of star-shaped polymers. These monomers, however, are not used to make homopolymers, but serve to cross-link other materials. Polymers formed from these agents are not known to be reworkable. Such monomers are disclosed, for example, in Ruckstein et al., "A Novel Breakable Cross-linker and pH-Responsive Star-Shaped and Gel Polymers, *Macromolecules,* 32: 3979–83 (1999).

There exists a need for curable (meth)acryl functionalized compositions which, once cured, are readily degradable by heating. There exists a need for such materials which are capable of curing at a desired temperature, while also being degradable by the application of relatively low temperature heat or by exposure to acidic medium.

SUMMARY OF THE INVENTION

In one aspect, the present invention is directed to a curable composition which includes: (i) a multi-functional alpha-alkoxyalkyl(meth)acrylate component which is free of conventional acetal or ketal groups and (ii) a free radical initiator, the composition being reworkable once cured. The multi-functional alpha-alkoxyalkyl(meth)acrylate component is the reaction product of: (a) a (meth)acrylic acid or a (meth)acrylate ester having a free carboxylic acid group and (b) a compound having two or more 1-alkenyl ether groups present and which is free of acetal and ketal groups, or a compound having both a 1-alkenyl ether group and a (meth)acrylate group present. Desirably, the multi-functional alpha-alkoxyalkyl(meth)acrylate compound is present in an amount of at least five percent by weight of the composition.

(Meth)acrylate compounds used to make the multi-functional alpha-alkoxyalkyl(meth)acrylate component of the present invention may include all conventional (meth)acrylic and (meth)acrylate acids which are capable of polymerizing through a free radical polymerization reaction. The compound having two or more 1-alkenyl ether groups present may be selected from 1-ethenyl (vinyl), 1-propenyl and 1-butenyl ethers, and cyclic compounds such as 3,4-dihydropyranyl compounds. The present invention also includes a free radical initiator, such as a peroxide.

Additionally, compositions of the present invention are capable of being cured by a variety of conventional mechanisms, such as radiation, e.g. UV light or heat, or by means of a redox catalyst composition.

In another aspect of the present invention, there is included a degradable composition which is the free radical polymerization reaction product of: (a) the reaction product of (i) a (meth)acrylic acid or a (meth)acrylate ester having a free carboxylic acid group and (ii) a compound having two or more 1-alkenyl ether groups present and which is free or acetal or ketal groups, or a compound having both a 1-alkenyl ether and a (meth)acrylate group present; and (b) a free radical initiator. The reworkable composition is capable of being controllably degraded by exposure to acidic conditions or elevated temperature conditions.

In another aspect of the present invention, there is included a kit for preparing a curable composition which includes: (i) a multi-functional alpha-alkoxyalkyl(meth) acrylate compound free of conventional acetal or ketal groups and (ii) a free radical initiator, where the composition is degradable once cured.

DETAILED DESCRIPTION OF THE
INVENTION

The present invention is directed to (meth)acrylate compositions which include a multi-functional alpha-alkoxyalkyl(meth)acrylate compound and a free radical initiator. The compositions are capable of forming reworkable polymers when cured. The multi-functional alpha-alkoxyalkyl (meth)acrylate compound is free of conventional acetal or ketal groups and is desirably the reaction product of a (meth)acrylic acid or a (meth)acrylate ester having a free carboxylic acid group and a compound including two or more 1-alkenyl ether groups and which is free of acetal and ketal groups, or a compound including one or more 1-alkenyl ether groups and a (meth)acrylate group. Optionally, mono-functional alpha-alkoxy alkyl(meth)acrylates and alkyl(meth)acrylates without alpha-alkoxyalkyl groups may be present.

Compositions of the present invention are suitable for a variety of uses. For example and without limitation, they may be used in forming reworkable adhesives, temporary coatings, masking agents, lithographic films, imaging layers, photoresists, medical implants, and barrier coatings.

Compositions of the present invention are easier and less expensive to prepare than conventional mono-acetal diacrylate compositions. They may be formed without the use of a solvent or catalyst and do not require purification prior to polymerization. These compositions are compatible with a wide range of conventional comonomers, initiators, and other compounds typically used in polymerizable compositions. Polymers prepared from acrylates of the present invention may contain two degradable groups per crosslink. Furthermore, when subjected to heat, they are degraded more easily than polymers prepared from conventional acetal acrylates that do not contain alpha-alkoxyalkyl substituents on the acrylate group.

(Meth)acrylic acid or (meth)acrylate ester compounds useful in the present invention include all conventionally known (meth)acrylic and (meth)acrylate compounds containing a carboxylic acid group. The particular (meth)acrylic acids or derivatives used are selected on the basis of the desired properties of the resultant multi-functional alpha-alkoxyalkyl(meth)acrylate product and of the polymerized product made therefrom.

As stated above, monofunctional (meth)acrylate esters (esters containing one (meth)acrylate group) also may be included in compositions of the present invention. Examples of useful monofunctional acrylates include cyclohexyl methacrylate, tetrahydrofurfuryl methacrylate, hydroxyethyl acrylate, hydroxypropyl methacrylate, t-butylaminoethyl methacrylate, cyanoethyl acrylate, chloroethyl methacrylate and m-butoxyethyl methacrylate. The materials are often incorporated as reactive diluents which are capable of copolymerizing with the various other polymerizable materials.

Conventional multi-functional (meth)acrylates, i.e., those without alpha-alkoxyalkyl groups may also optionally be included in relatively small amounts, e.g. about 1.0 to about 5.0%, to control the rate and temperature of degradation of the formed polymers of the present invention. However, their inclusion will generally result in incomplete network degradation during reworking and their concentration in terms of acrylate group equivalence should not exceed that of the inventive materials.

Compositions of the present invention include multi-functional alpha-alkoxyalkyl(meth)acrylates which result from the reaction of a (meth)acrylic acid compound, such as those stated above, with a compound including two or more 1-alkenyl ether groups which is free of acetal and ketal groups, or a compound free of acetal and ketal groups and including one or more 1-alkenyl ether groups and a (meth) acrylate group. For example, such compounds having 2 or more 1-alkenyl ether groups present include, without limitation, bis-1-alkenyl ethers, tris-1-alkenyl ethers, and tetra-1-alkenyl ethers. Desirably, such compounds are 1-ethenyl (vinyl), 1-propenyl and 1-butenyl ethers. Multi-functional alpha-alkoxyalkyl(meth)acrylates formed from the reaction of these 1-alkenyl ethers with a (meth)acrylic acid derivative have an alkoxy group which is alpha to the ethereal oxygen atom of the ester group. Such groups are readily cleaved at elevated temperatures and when incorporated into a polymer network, as in the present invention, function as a network breaking point when the polymer is heated above the degradation threshold temperature.

One vinyl ether suitable for use in the present invention is 1,6-hexanediol divinyl ether, represented by the structure:

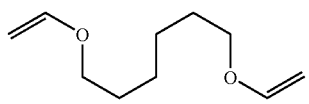

Other examples of vinyl ethers which may be used in the present invention are multi-functional vinyl ethers such as diethyleneglycol divinyl ether, tetraethyleneglycol divinyl ether, butanediol divinyl ether, cyclohexanedimethanol divinyl ether, polytetrahydrofuran divinyl ether, polytetrahydrofuran divinyl ether, 1,3-benzenedicarboxylic acid bis[4-(ethenyloxy)butyl]ester, bis[4-(vinyloxy)butyl]adipate, and tris[4-vinyloxy)butyl]trimellitate. Additionally, other 1-alkenyl ethers may be used in the present invention, such as 1,4-di(1'propenoxy)butane, 1,6-di(1'propenoxy)hexane, 1,10-di(1'-propenoxy)decane, triethyleneglycol dipropenyl ether, trimethylolpropane tripropenyl ether, sorbitol hexapropenyl ether, pentaerythritol tetrapropenyl ether, 1,2,3-tri(1'-propenoxy)propane, 1,4-di(1'-butenoxy)butane, 1,6-di(1'-butenoxy)hexane, 1,10-di(1'butenoxy)decane and 2-(3,4-dihydropyranyl)methyl 3,4-dihydropyran-2-carboxylate. Further, different types of 1-alkenyloxy groups may be present on the same compound, such as with 1(1-butenoxy)-4-vinyloxybutane.

Compounds useful in compositions of the present invention may be formed from the reaction of methacrylic acid and divinyl ethers and may be represented generally by the following structure:

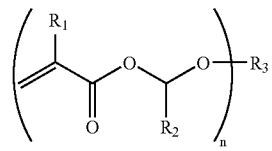

wherein $R_1$ is H or $CH_3$; $R_2$ is $C_1$–$C_8$ alkyl, alkylaryl or cycloalkyl; $R_3$ is selected from an n-vale organic fragment or radical derived from n-functional vinyl ether and may include $C_1$–$C_{30}$ alkyl, cycloalkyl, aryl, alkyleneoxy (such as ethyleneoxy or propyleneoxy), alkyl ester, aryl ester, alkyl carbamate, and aryl carbamate, and may be substituted or unsubstituted, linear or branched; and wherein n is 2, 3, or 4.

Further, compounds useful in compositions of the present invention may be formed from the reaction of a 1-alkenyl ether(meth)acrylate, such as 2-vinyloxyethyl methacrylate, and dicarboxylic acids and may be represented generally by the following structure:

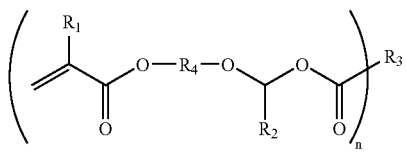

wherein $R_1$, $R_2$ and $R_3$ are as stated above; $R_4$ is $C_1$–$C_{12}$ alkyl, aryl, alkaryl or cycloalkyl; and wherein n is as stated above.

Further, compounds useful in compositions of the present invention may be formed from the reaction of a 1-alkenyl ether(meth)acrylate, such as 2-vinyloxyethyl methacrylate, and methacrylic acid and may be represented generally by the following structure:

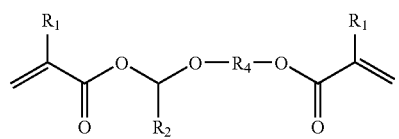

wherein $R_1$, $R_2$, and $R_4$ are as stated above; and wherein n is as stated above.

Further, compounds useful in compositions of the present invention may be formed from the reaction of a (meth) acrylate ester having a free carboxylic acid group, such as beta-carboxyethyl acrylate, and divinyl ethers and may be represented generally by the following structure:

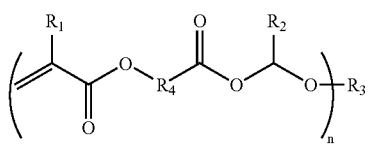

wherein $R_1$, $R_2$, $R_3$, and R4 are as stated above; and wherein n is as stated above.

Further, compounds useful in compositions of the present invention may be formed from the reaction of difunctional cyclic vinyl ethers and methacrylic acid and may be represented generally by the following structure:

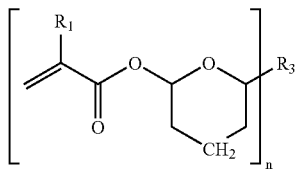

wherein $R_1$ and $R_3$ are as stated above; n is as stated above; and m is 1, 2, or 3.

Similar cyclic alpha-alkoxyalkyl(meth)acrylates may be obtained from the reaction of a (meth)acrylate ester having a free carboxy-ethyl acrylate, and a difunctional cyclic vinyl ether.

The curable compositions of the present invention may include the inventive multi-functional alpha-alkoxyalkyl (meth)acrylate compounds in amounts sufficient to impart the desired degradability or reworkability. Desirably, the inventive compounds are present in amounts of about 5.0% to about 99% by weight of the total composition.

Compositions of the present invention also include a suitable free radical initiator which is present in an amount sufficient to initiate polymerization of the multi-functional alpha-alkoxyalkyl(meth)acrylate monomer. Desirably, such initiators are peroxy free-radical initiators or azonitrile initiators. Examples of suitable peroxy free-radical initiators are those described in U.S. Pat. No. 4,287,330 to Rich, specifically incorporated herein by reference. Desirably, the peroxy free-radical initiator used in the present invention is an organic hydroperoxide such as cumene hydroperoxide ("CHP"), methylethyl ketone hydroperoxide, t-butyl hydroperoxide, a peroxy ester such as t-butyl perbenzoate, or a diacylperoxide such as benzoyl peroxide. Additional hydroperoxides may also be used, such as p-menthane hydroperoxide, diisopropylbenzene hydroperoxide, and pinene hydroperoxide.

Photoinitiators, those that will respond to UV radiation to initiate and induce curing of the multi-functional alpha-alkoxyalkyl acrylates, which are useful in the present invention include benzophenone and substituted benzophenones, acetophenone and substituted acetophenones, benzoin and its alkyl esters, xanthone and substituted xanthones, diethoxy-acetophenone, benzoin methyl ether, benzoin ethyl ether, benzoin isopropyl ether, diethoxyxanthone, chloro-thio-xanthone, N-methyl diethanol-amine-benzophenone, 2-hydroxy-2-methyl-1-phenyl-propan-1-one, 2-benzyl-2-(dimethylamino)-1-[4-(4-morpholinyl)phenyl]-1-butanone and mixtures thereof. Photoinitiators suitable for use in the present invention that will respond to visible light to initiate and induce curing include camphoroquinone peroxyester initiators and 9-fluorene carboxylic acid peroxyesters. Thermal initiators include 2,2'-azobisisobutyronitrile. The initiators set forth above are for the purposes of illustration only and are in no way meant to limit the initiators that may be used in the present invention.

The radical initiators desirably are present in amounts of about 0.01% to about 10%, and more desirably about 0.1 to 0.5% by weight of the total composition.

The compositions of the present invention may be cured by any suitable conventional free radical curing mechanism which will effect the initiation reaction. For example, actinic radiation, such as UV and visible light, may be used. Additionally, heat curing may be used, as well as cure under anaerobic conditions.

Known additives, such as accelerators, stabilizers, inhibitors, chelating agents, thickeners, plasticizers, fillers, elastomers, thermoplastics, and comonomers may also be employed in compositions of the present invention. For example, compositions of the present invention may include accelerators to accelerate the initiation reaction. Examples of accelerators useful in the present invention include amines, imidazoles, and hydrazines such as described in U.S. Pat. No. 4,287,330 to Rich.

Examples of useful accelerator compounds include: tertiary alkyl amines, rhodamines and alkoxy amines; 1-acetyl-2-phenyl hydrazine, 1-acetyl-2(p-tolyl)para-toluene sulfonyl hydrazide, 1-formyl-2-phenyl hydrazine and combinations thereof.

Additionally, stabilizers, inhibitors and chelating agents may also be present in compositions of the present invention in order to control and prevent premature peroxide decomposition and polymerization. Inhibitors useful in the present invention include phenols such as hydroquinone and quinones. Chelating agents may be employed to remove trace amounts of metal contaminants present in the inventive compositions. An example of a useful chelating agent is the tetrasodium salt of ethylenediamine tetraacetic acid ("EDTA").

Other agents such as thickeners, plasticizers, fillers, elastomers, thermoplastics, and other well-known additives may be incorporated into compositions of the present invention where functionally desirable.

Having set forth examples of suitable components which may be present in compositions of the present invention and general structures of certain components, specific examples of compositions which were formulated and tested will now be set forth below.

EXAMPLE 1

Synthesis of Reactive Component Compound A:
bis-1-(1',6'-hexoxy)ethyl methacrylate Compound A is an example of a multi-functional alpha-alkoxyalkyl methacrylate ester useful in compositions of the present invention.

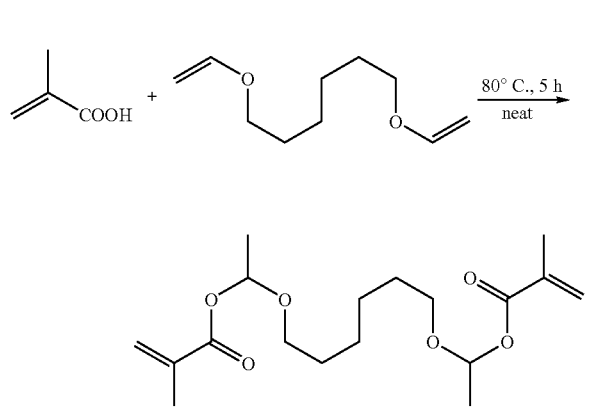

1,6-hexanediol divinyl ether (17.003 g; 0.1 moles) and 4-tert-butylcatechol (0.0071 g; 0.043 millimoles) were added to a 50 ml reaction flask fitted with a heating mantel, thermocouple and pressure compensating addition funnel, thermocouple, reflux condenser and magnetic stirrer. The mixture was stirred and methacrylic acid (17.204 g; 0.2 moles) was added dropwise over 45 minutes, while the temperature was maintained between 74° C. and 82° C. When the addition was complete, the mixture was heated at 80° C. for a further 5 hours and cooled to room temperature to afford the liquid monomer bis-1-(1',6'-hexoxy)ethyl methacrylate (Compound A) in 98% yield (33.40 g). The structure was confirmed by $^1$H NMR and infrared spectral analysis.

EXAMPLE 2

Synthesis of Reactive Component Compound B:
triethylene glycol bis-[1-(2-acryloxyethyl)ethyl ether]

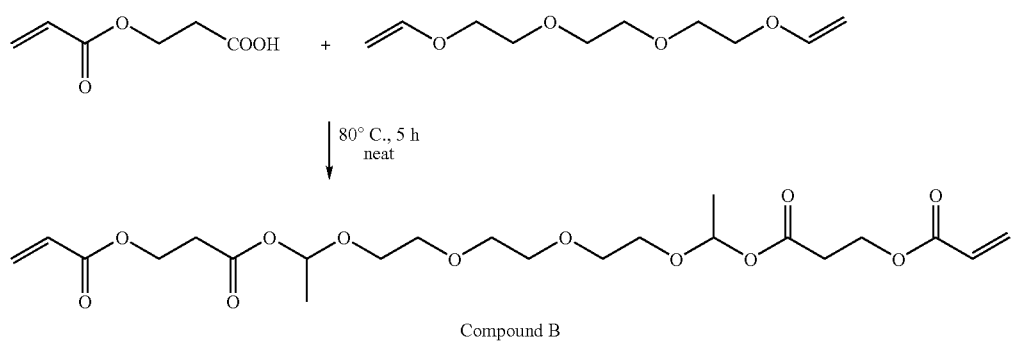

Compound B

A mixture of 1 equivalent of triethylene glycol divinyl ether and 2 equivalents of beta-carboxyethyl acrylate are reacted together according to the procedure described in Example 1 to give triethylene glycol bis-[1-(2-acryloxyethyl)ethyl ether] (Compound B) in quantitative yield. In a composition of the present invention, Compound B is capable of curing through a free radical polymerization reaction to form a reworkable polymer.

EXAMPLE 3

Synthesis of Reactive Component Compound C:
1-n-butoxyethyl methacrylate

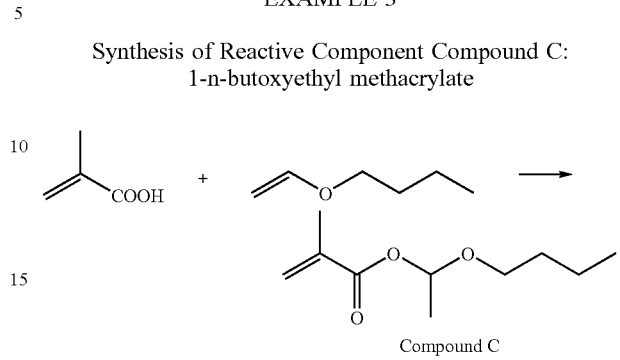

Compound C

The reaction procedure of Example 1 was repeated using equimolar amounts of n-butylvinyl ether and methacrylic acid. The structure of the product, 1-n-butoxyethyl methacrylate (Compound C) was obtained in 88% yield. Compound C is an example of a mono-functional alpha-alkoxyalkyl(meth)acrylate which may optionally be included with multi-functional alpha-alkoxyalkyl(meth)acrylate compounds in compositions of the present invention. The structure of Compound C was confirmed by $^1$H NMR and infrared analysis.

EXAMPLE 4

Synthesis of Reactive Component Compound D:
1-tert-butoxyethyl methacrylate

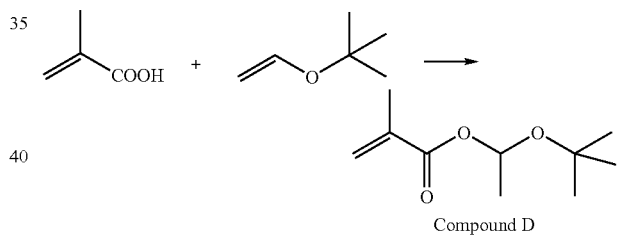

Compound D

The reaction procedure of Example 1 was repeated using equimolar amounts of tert-butylvinyl ether and methacrylic acid. The structure of the product, 1-tert-butoxyethyl methacrylate (Compound D) was obtained in 79% yield. Compound D is an example of a mono-functional alpha-alkoxyalkyl(meth)acrylate which may optionally be included with multi-functional alpha-alkoxyalkyl(meth)acrylate compounds in compositions of the present invention. The structure of Compound D was confirmed by $^1$H NMR and infrared spectral analysis.

EXAMPLE 5

Preparation of UV Curable Composition 1

Composition 1, a UV light curable composition of the present invention, was prepared by blending together the component materials shown in Table 1 to give a clear solution:

TABLE 1

Inventive Composition 1

| Component | % by weight |
|---|---|
| Inventive Compound A | 96.7 |
| 2,2-dimethoxy-2-phenylacetophenone[1] | 3.3 |

[1]Photoinitiator

A film of Composition 1, 0.5 mm in thickness, was prepared on a microscope glass slide using a draw down bar. The coated slide was exposed to a collimated beam of UV light from a projector (Oriel projector model 87331) fitted with a mercury arc lamp and quartz lens. The light intensity incident on the coating was 20 mW/cm$^2$ in the wavelength range 300 to 400 nm. After 30 seconds exposure the slide was removed. It adhered strongly to the surface of the glass. The cured coating was removed from the slide using a sharp blade and was found to be insoluble in acetone and dichloromethane. This indicates that the monomer underwent a crosslinking polymerization resulting from exposure to the UV light.

EXAMPLE 6

Acid Promoted Degradation of UV Cured Composition 1

A pair of 1×4 in$^2$ glass slides were brushed with a 0.5% solution of lecithin to give release treated surfaces. The slides were assembled in an overlapping configuration of 1×2 in$^2$ with a 1.0 mm gap separating the slides. The overlapping space between the slides was filled with the UV curable Composition 1 by capillary flow. The entire assembly was exposed to UV light under the conditions described in Example 3 to cure the adhesive. After curing, the release slides were removed to provide a free film of the cured adhesive coating. The film was immersed in a solution of 1 part 10% aqueous hydrochloric acid and 1 part methanol at room temperature. After 24 hours, the film had eroded, indicating the cured polymer is degraded by the acid solution.

EXAMPLE 7

De-bonding of Adhesive Joint Assembled With Composition 1

The experiment of Example 6 was repeated using glass slides, which were not treated with a release coating. After UV exposure, a strongly bonded glass-to-glass adhesive lap joint was obtained. The entire specimen was immersed in the acid solution under ambient conditions. The adherents fell apart within 1 hour of immersion without the application of external force. This result indicates that a rapid degradation of adhesion occurred at the interface when the joint was immersed in acid solution.

EXAMPLE 8

Preparation of UV Light Curable Composition 2: Compound A/Methacrylate Blend

A UV light curable Composition 2 of the present invention was prepared by blending together the component materials shown in Table 2 to give a clear solution:

TABLE 2

Composition 2

| Component | % by weight |
|---|---|
| Inventive Compound A | 48.3 |
| Ethoxylated hydroxyethyl methacrylate | 48.7 |
| DAROCURE 1173[1] | 3.0 |

[1]2-hydroxy-2-methyl-1-phenylpropan-1-one

Ethoxylated hydroxyethyl methacrylate was supplied by Sartomer Co. and DAROCURE 1173, a photoinitiator, was supplied by Merck & Co. Adhesive joints were prepared with the blended Composition 2 in the manner described in Example 6 using glass slides, which were not release treated. After UV light curing, the slides were strongly bonded together and could not be separated without breaking the glass.

EXAMPLE 9

Acid Promoted Degradation of UV Light Cured Composition 2

A slide assembly as prepared in Example 8 was immersed in the acid solution of Example 4 for 10 minutes. After this time the slides could not be separated. The joint was re-immersed for an additional 10 minutes, after which time the slides were easily pulled apart. A cured film of Composition 2 was prepared between release treated slides in the manner described in Example 6. The film was completely dissolved in the acid solution of Example 6 after 16 hours of immersion.

EXAMPLE 10

Thermally Induced Decomposition of UV Cured Composition 2 Joints

A glass-glass adhesive joint was prepared using Composition 2 in the manner described in Example 8. The joint was heated in a stream of hot air. After about 10 seconds of heating the slides were easily separated. The temperature of the joint was estimated to be 150° C. when debonding occurred.

EXAMPLE 11

Thermogravimetric Analyses of UV Cured Inventive Compositions 3–7 and Comparative Composition 8

UV light sensitive adhesive Compositions 3–8 were prepared by blending together inventive monomers and photoinitiators in the in parts by weight shown in Table 3:

TABLE 3

Inventive Compositions 3–7 and Comparative Composition 8

| Component | Composition 3 | Composition 4 | Composition 5 | Composition 6 | Composition 7 | Composition 8 (Comparative) |
|---|---|---|---|---|---|---|
| Compound A | 100 | 50 | 25 | 50 | 25 | 0 |
| Compound C | 0 | 50 | 75 | 0 | 0 | 0 |
| Compound D | 0 | 0 | 0 | 50 | 75 | 0 |
| Glycerol dimethacrylate | 0 | 0 | 0 | 0 | 0 | 100 |
| DAROCURE 1173 (photoinitiator) | 4 | 4 | 4 | 4 | 4 | 4 |

Thin films of Compositions 3–8, about 0.25 mm in film thickness, were prepared on glass slides. Each film was covered with a polyethylene release film and a second glass slide. The entire assembly was exposed to UV light through the glass/PE side for 120 seconds to cure the film under conditions similar to those described in Example 5. After exposure, the cured polymer films were removed from the glass substrate and analyzed by dynamic thermogravimetric analysis at a heating rate of 20° C./minute. The analyses were conducted under a nitrogen atmosphere. The decomposition temperature was determined from the onset of weight loss. The results are presented in Table 4:

TABLE 4

Decomposition Temperatures for Inventive Compositions 3–7 and Comparative Composition 8

| | Composition 3 | Composition 4 | Composition 5 | Composition 6 | Composition 7 | Composition 8 (Comparative) |
|---|---|---|---|---|---|---|
| Decomposition Temperature (° C.) | 266 | 235 | 210 | 214 | 190 | 422 |

As shown in Table 4, inventive Compositions 3–7 containing multi-functional alpha-alkoxyalkyl(meth)acrylates decompose at significantly lower temperatures than comparative Composition 8, a conventional methacrylate-based UV curable adhesive, illustrating the improved decompositions properties of compositions of the present invention. The specific temperature of decomposition may be controlled by the relative amounts of mono to difunctional monomer that is present in the composition. As the concentration of mono-functional monomer in the uncured adhesive is increased, so the decomposition temperature of the cured adhesive is decreased, as seen when Composition 3 is compared with Compositions 4 and 5 and when Composition 3 is compared with Compositions 6 and 7.

Furthermore, the decomposition properties may also be affected by altering the structure of the alkyl group of the alpha-alkoxyalkyl substituent of the (meth)acrylate ester. Compositions 4 and 5 contain a multi-functional alpha-alkoxyalkyl ester with a primary-alkyl group, whereas Compositions 6 and 7 are tertiary-alkyl substituted. Comparing the decomposition temperatures of Composition 4 with Composition 6 and of Composition 5 with Composition 7, there is a reduction of about 20° C. in decomposition temperature when a primary-substituted monomer is replaced with a tertiary-substituted isomer at the same concentration.

EXAMPLE 12

Inventive Anaerobic Adhesive Composition 9

Inventive anaerobically curing Composition 9 and conventional anaerobically curing Composition 10, used as a comparative composition, were prepared by blending together components in the amounts by weight shown in Table 5:

TABLE 5

Inventive Composition 9 and Comparative Composition 10

| Component | Composition 9 | Composition 10 (Comparative) |
|---|---|---|
| Compound A | 96 | 0 |
| PEGMA[1] | 0 | 96 |
| cumene hydroperoxide | 2 | 2 |
| dimethyl p-toluidine | 1 | 1 |
| saccharin | 1 | 1 |

[1]polyethyleneglycol dimethacrylate

The ability of anaerobic adhesive Compositions 9 and 10 to maintain adhesive strength on threaded fasteners after curing at room temperature was determined by torque strength testing, according to test method ISO 10964. Test specimens were assembled by applying adhesive to the threads of cleaned steel bolts. When the threads of the bolts were completely wet with adhesive, the corresponding nuts were applied. The assembled nut and bolt specimens were kept at room temperature for 24 hours to ensure that curing was complete. Five specimens were prepared for each of Compositions 9 and 10 and the average break and prevailing torque strength were determined using a calibrated torque analyzer. The results obtained are shown in Table 6:

TABLE 6

Torgue-Strength Determinations for Compositions 9 and 10

| Composition | Break-torque strength (N · m) | Prevailing-torque strength (N · m) |
|---|---|---|
| 9 | 9.3 | 12.3 |
| 10 | 7.2 | 22.6 |

As shown in Table 6, Inventive Composition 9 has a higher break-torque strength but a lower prevailing-torque strength than comparative Composition 10, indicating that compounds and compositions of the present invention are well suited for use in the production of anaerobically curing adhesives.

EXAMPLE 13

Synthesis of Reactive Component Compound E: 3-oxapentyl 1,4-dimethacrylate

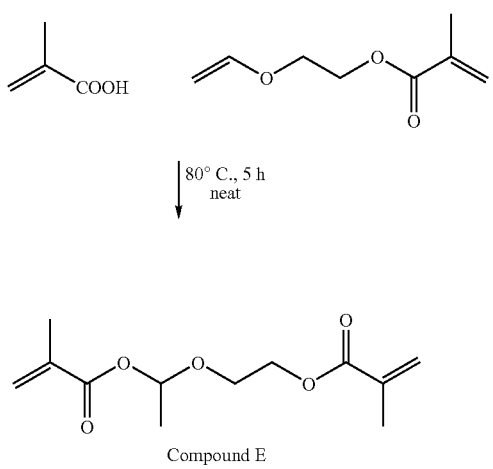

Compound E

An equimolar mixture of 2-vinyloxyethyl methacrylate and methacrylic acid are reacted together, according to the procedure set forth in Example 1, to give 3-oxapentyl 1,4-dimethacrylate (Compound E) in good yield.

EXAMPLE 14

Synthesis of Reactive Component Compound F: di-alpha-(2-methacryloxyethyl)ethyl pimelate

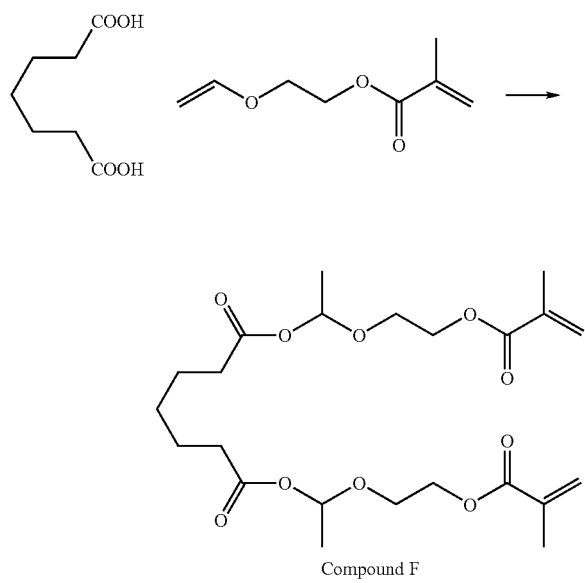

Compound F

A mixture of 1 equivalent of pimelic acid and 2 equivalents of 2-vinyloxyethyl methacrylate are reacted together, according to the procedure set forth in Example 1, to give the corresponding adduct di-alpha-(2-methacryloxyethyl)ethyl pimelate (Compound F).

EXAMPLE 15

Synthesis of Reactive Component G: Reaction Product of 2-(3,4-dihydropyranyl)methyl, 3,4-dihydropyran-2-carboxylate and Methacrylic Acid

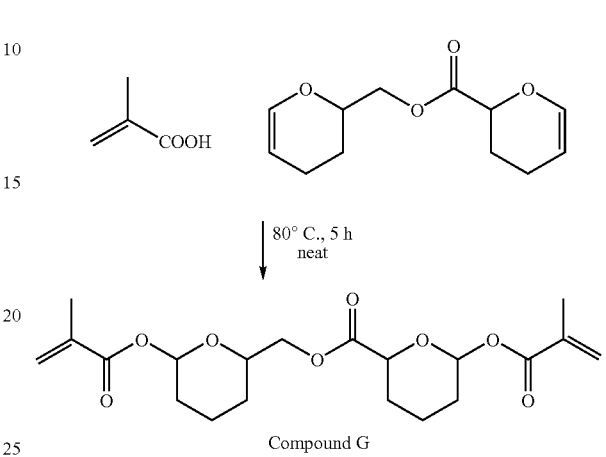

Compound G

A mixture of 1 equivalent of 2-(3,4-dihydropyranyl)methyl, 3,4-dihydropyran-2-carboxylate and 2 equivalents of methacrylic acid are reacted together, according to the procedure set forth in Example 1, to give the corresponding di-alpha-tetrahydropyranyl methacrylate (Compound G).

The examples set forth above serve to illustrate the present invention, but in no way are intended to limit the spirit and scope thereof, which is defined by the following claims.

What is claimed is:

1. A curable composition, comprising: (i) a multi-functional alpha-alkoxyalkyl (meth)acrylate compound comprising an ester acetal or ester ketal and free of conventional acetal or ketal groups; and (ii) a free radical initiator, said composition being degradable once cured.

2. The curable composition of claim 1, wherein said multi-functional alpha-alkoxyalkyl (meth)acrylate compound is the reaction product of: (a) a (meth)acrylic acid or a (meth)acrylate ester having a free carboxylic acid group; and (b) a compound including two or more 1-alkenyl ether groups and being free of conventional acetal and ketal groups, or a compound free of conventional acetal and ketal groups and including one or more 1-alkenyl ether groups and a (meth)acrylate group.

3. The curable composition of claim 1, wherein said multi-functional alpha-alkoxyalkyl (meth)acrylate compound is the reaction product of: (a) a multi-functional carboxylic acid; and (b) a compound free of acetal and ketal groups and including one or more 1-alkenyl ether groups and a (meth)acrylate group.

4. The curable composition of claim 1, wherein said multi-functional alpha-alkoxyalkyl (meth)acrylate compound is present in an amount of about 5% to about 99% by weight of said composition.

5. The curable composition of claim 1, wherein said multi-functional alpha-alkoxyalkyl (meth)acrylate compound has a functionality of two or greater.

6. The curable composition of claim 2, wherein said compound having two or more 1-alkenyl ether groups present is selected from the group consisting of 1-ethenyl ether, 1-propenyl ether, 1-butenyl ether and 3,4 dihydropyranyl compounds.

7. The curable composition of claim 2, wherein said compound having two or more 1-alkenyl ether groups present is selected from the group consisting of diethyleneglycol divinyl ether, tetraethyleneglycol divinyl ether, butanediol divinyl ether, cyclohexanedimethanol divinyl ether, polytetrahydrofuran divinyl ether, polytetrahydrofuran divinyl ether, 1,3-benzenedicarboxylic acid bis[4-(ethenyloxy) butyl]ester, bis[4-(vinyloxy)butyl]adipate, tris[4-vinyloxy) butyl]trimellitate, 1,4-di(1'propenoxy)butane, 1,6-di(1'propenoxy)hexane, 1,10-di(1'-propenoxy)decane, triethyleneglycol dipropenyl ether, trimethylolpropane tripropenyl ether, sorbitol hexapropenyl ether, pentaerythritol tetrapropenyl ether, 1,2,3-tri(1'-propenoxy)propane, 1,4-di(1, -butenoxy)butane, 1,6-di(1'-butenoxy)hexane, 1,10-di(1'butenoxy)decane, 1(1-butenoxy)-4-vinyloxybutane, 2-(3,4-dihydropyranyl)methyl 3,4-dihydropyran-2-carboxylate and combinations thereof.

8. The curable composition of claim 1, wherein said free radical initiator is selected from the group consisting of cumene hydroperoxide, methylethyl ketone hydroperoxide, t-butyl hydroperoxide, t-butyl perbenzoate, p-menthane hydroperoxide, diisopropylbenzene hydroperoxide, pinene hydroperoxide, benzophenone, substituted benzophenone, acetophenone, substituted acetophenone, benzoin, alkyl esters of benzoin, xanthone, substituted xanthone, diethoxyacetophenone, benzoin methyl ether, benzoin ethyl ether, benzoin isopropyl ether, diethoxyxanthone, chloro-thio-xanthone, azo-bisisobutyronitrile, N-methyl diethanol-amine-benzophenone, 2-hydroxy-2-methyl-1-phenyl-propan-1-one, 2-benzyl-2-(dimethylamino)-1-[4-(4-morpholinyl) phenyl]-1-butanone, camphoroquinone peroxyester, 9-fluorene carboxylic acid peroxyester and combinations thereof.

9. The curable composition of claim 1, wherein said composition is capable of being cured by a mechanism selected from the group consisting of ultraviolet light, visible light, heat, redox and combinations thereof.

10. The curable composition of claim 1, further comprising one or more compounds selected from the group consisting of accelerators, stabilizers, inhibitors, chelating agents, thickeners, plasticizers, fillers, elastomers, thermoplastics, and comonomers.

* * * * *